United States Patent Office 2,912,454
Patented Nov. 10, 1959

2,912,454
PREPARATION OF ALKYL α-CYANOACRYLATES

Charles H. McKeever, Meadowbrook, Pa., assignor to Rohm & Haas Company, Philadelphia, Pa., a corporation of Delaware No Drawing. Application May 6, 1957
Serial No. 657,040

6 Claims. (Cl. 260—465.4)

This invention deals with a process for preparing monomeric alkyl α-cyanoacrylates.

Several schemes for preparing alkyl α-cyanoacrylates have heretofore been suggested. In one of these an alkali metal derivative of an alkyl cyanoacetate is reacted with an alkyl chloromethylether to form the α-cyano-α-alkoxymethylacetate, which is then mixed with water. There results a crude partially polymerized alkyl α-cyanoacrylate. In another approach an alkyl cyanoacetate is reacted with formaldehyde supplied in the form of an aqueous or alcoholic solution or derived from a revertible polymer. The resulting methylol compound decomposes to alkyl α-cyanoacrylate, which, in the presence of the water supplied or present in traces or formed in the reactions, almost immediately goes to low molecular weight polymers. Thus, crude ester formed is actually separated almost entirely in the form of polymer.

Even when an alkyl cyanoacetate is reacted with formaldehyde in an organic solvent and the water formed is removed, mechanically, by a conventional dehydrating agent, or by azeotropic distillation in the usual manner, polymer forms. As is known, this polymer can be cracked to monomer in major part when it is heated. But even though the polymer has been carefully dried by dehydrating agent or by azeotropic distillation, the distillate of alkyl α-cyanoacrylate tends to polymerize again spontaneously. Some polymerization always occurs in the distilling column, unless special precautions are taken. Some distillates cannot be held as monomer even a few hours, although the apparatus and container have been baked to remove surface moisture. In the methods used heretofore, there has been a marked lack of uniformity of results, some batches existing as monomer shorter or longer than others. It has not been possible to predict the life of a given preparation and this variability is most troublesome. Furthermore, when it is desired to polymerize the distilled esters as heretofore made behaviors are erratic and outcome is uncertain. Polymers, including homopolymers and copolymers, vary, therefore, in their properties and utilities.

Without doubt the difficulties of preparing alkyl α-cyanoacrylates, their instability as heretofore made, their erratic, irregular, unpredictable behavior, and related problems, have practically precluded heretofore the practical use of alkyl α-cyanoacrylates in the purity required for making cast polymers.

It is clearly desirable to provide a method whereby monomeric alkyl α-cyanoacrylates can be made in a very pure form which presents adequate stability for shipping and handling and which permits conversion to polymers under practical conditions to uniform and reproducible products with desirable properties, particularly for casting.

I find that an important improvement results when the reaction mixture obtained by condensing approximately equimolar quantities of a non-tertiary alkyl cyanoacetate and formaldehyde is treated with acetic anhydride or its equivalent, the treated mixture is heated to distilling temperatures, and distillate is taken off. Improvements are found in yield, in quality, and in reproducibility.

The first reaction mixture is obtained by reacting about equimolar proportions of formaldehyde and a lower alkyl cyanoacetate, such as methyl, ethyl, isopropyl, propyl, isobutyl, or sec-butyl cyanoacetate or, if desired, a larger alkyl cyanoacetate. The temperature of this reaction is between 50° and 110° C.

The formaldehyde may be an aqueous or an alcoholic solution or may be gaseous or may be supplied from a revertible polymer.

The reaction of formaldehyde and alkyl cyanoacetate may be accelerated by the presence of a small proportion, such as 0.01% to 0.1% by weight of cyanoacetate, of an alkaline agent, although the presence of such a catalyst is not essential. For this purpose an alkali metal hydroxide may be used or an amine, such as piperidine, pyrrolidine, morpholine, ethylamine, dimethylamine, pyridine, ethanolamine, dimethylethanolamine, or triethanolamine. The acetates of amines work quite as well as amines themselves.

Water is now usually separated. This may be done by allowing a water layer to form and drawing it off. Water may be taken off in a conventional manner by heating the reaction mixture with a solvent or solvents, which form an azeotrope with water, as benzene and/or an alcohol. The reaction mixture may be treated with a common drying agent such as soluble anhydrite (active calcium sulfate), magnesium sulfate, or sodium sulfate or the reaction mixture may be subjected to low pressure with warming to drive off water, although these steps are not essential.

The mixture is treated with acetic anhydride. The mole ratio of acetic anhydride to the units of alkyl α-cyanoacetate is usually from about 0.1:1 to 1.5:1. More acetic anhydride may be added in case one of the above methods of removing free water has not been used, the acetic anhydride then being used in excess of any water present.

In place of acetic anhydride there may be used propionic anhydride or mixtures of these two anhydrides. Also effective are acetyl chloride and propionyl chloride. A mixture of acetic anhydride and acetyl chloride is especially effective, the acetyl chloride being used in a proportion of one to twenty percent of the anhydride.

The reaction mixture containing free acetic anhydride is heated to a temperature at which acetic acid is distilled and then acetic acid is distilled off. Acetic acid and anhydride may then both be distilled off. Heating of the reaction mixture, as modified by treatment with acetic anhydride, is continued and pressure is reduced. At pot temperatures from 160° to 240° C. monomeric alkyl α-cyanoacrylate is evolved and taken off. The presence of a small amount of acetic acid (or anhydride) in the distillate seems to stabilize the monomers. Pressures from 100 to 1 mm. are used with a pressure of 2 to 40 mm. being preferred.

In performing the above steps one may wish to supply the optimum environment by using apparatus which has been heated and is, therefore, relatively free of moisture. Also, there may be used a small amount of a conventional drying agent, such as phosphorus pentoxide to help dispose of moisture from apparatus walls or any moisture picked up during the handling of the reaction mixture from the formaldehyde reaction. Also, there may be added to the dry reaction mixture a fluidizing agent, since this reaction mixture with the polymer tends otherwise to be viscous. As agents for maintaining the mixture fluid there may be used tricresyl phosphate, dibutyl or dioctyl phthalate, dioctyl sebacate, the dimethyl, diethyl, or dibutyl ether of ethylene glycol or diethylene glycol, or other stable, high boiling solvent, or a high boiling hydrocarbon, even though this may not be entirely miscible with the starting mixture.

Another aid to obtaining and keeping the alkyl α-cyanoacrylates in a good state is to add to the freshly distilled ester a stabilizer and also a polymerization inhibitor to guard against anionic and/or free-radical polymerization. Such an inhibitor is also desirably added to the reaction mixture before it is heated to form monomer.

Useful stabilizers include phosphorus pentoxide, anhydrous carboxylic acids, such as acetic acid, acrylic acid, methacrylic acid, or itaconic acid, also stannic chloride, boron trifluoride complexes with ethers, carboxylic acids, ketones, and other oxygenated organic compounds, ferric chloride, and other members of the class of Lewis acids. Effective inhibitors include hydroquinone, and its methyl ether, pyrogallol, and di-β-naphthol.

Details of operation are given in the following examples which are presented for purposes of illustration and not by way of limitation. Parts are by weight unless otherwise designated.

Example 1

(a) Into a reaction vessel equipped with stirrer, thermometer, and reflux condenser are charged 360 parts (12 moles) of paraformaldehyde and 1238 parts (12.5 moles) of methyl cyano-acetate. The mixture is stirred and heated to 80° C. At this point addition of a catalyst solution is started. This solution consists of 0.3 part of piperidine dissolved in 200 parts of the dimethyl ether of diethyleneglycol. The addition takes place over an hour, during which time the temperature of the reacting mixture varies from 82° to 87° C. and is maintained in this range with the aid of external cooling. The pH of the mixture is always below a value of seven. The mixture is now stirred for an hour with the temperature maintained at 85° C. By this time all of the paraformaldehyde has been taken up to give a clear, but viscous solution. The reaction mixture is subjected to reduced pressure and while it is held at 85°–87° C., water is taken off at 150 mm. pressure. Water is collected in a chilled trap and amounts to 180 parts (10 moles).

(b) The reaction mixture is cooled to 70° C. and 306 parts (3 moles) of acetic anhydride is added over a period of about 15 minutes while the reaction mixture is stirred and kept below 90° C. Stirring is continued for an hour with the temperature at 85° to 90° C. About five parts of pyrogallol is added.

The reaction vessel is now equipped with a gas inlet tube and a short unpacked column with a complete take-off distillation head. Addition is made of 10 parts of phosphorus pentoxide and five parts of 100% phosphoric acid. A small stream of dry nitrogen is passed through the apparatus. The reaction mixture is heated and the pressure in the apparatus reduced to about 20 mm. Acetic acid and anhydride are distilled off. At about 160° C. cracking of polymer begins and monomer is distilled into a receiver. Most of the conversion of polymer to monomer takes place between 180° and 205° C., but heating is continued to a pot temperature of about 240° C. The pressure is held below 20 mm. during this step with the final pressure at about 5 mm. The distillate amounts to 1210 parts (90% of theory). The distillate is identified as methyl α-cyanoacrylate. It forms a polymer when treated with water or alcohol. Upon redistillation at 47°–49° C./1.8 mm. ($n_D^{25}=1.443$), there is obtained a clear, colorless liquid which, when treated in a glass-walled cell with a few tenths percent of azodiisobutyronitrile, yields a water-white, crystal-clear cast sheet which has a heat distortion temperature of 157° C., Vicat softening temperature of 168° C., and an impact strength of 5.1 ft. lbs.

Example 2

The procedure of Example 1 is followed except that 200 parts of tricresyl phosphate is added to the mixture of acetic anhydride and polymer. Cracking begins about 170° at 20–25 mm. pressure and heating is continued to 240° C. The distillate is methyl α-cyanoacrylate in an amount of 1260 parts (93.5% yield). This product polymerizes with water or alcohol to form a low molecular weight polymer. It polymerizes under the influence of a free-radical initiator to give polymers of high molecular weight.

Example 3

The procedure of Example 1 is followed except that the step of removing water at reduced pressure is omitted and in place of 306 parts of acetic anhydride there are added 1600 parts of acetic anhydride and the mixture is stirred and heated at 85°–90° C. for one hour.

Acetic anhydride and acid are driven off by heating up to 160° C. Pressure is reduced to 10 mm. and then gradually to 5 mm. and monomeric methyl cyanoacetate is distilled off up to a pot temperature of 225° C. The yield is 1250 parts of pure ester.

The procedure of the examples is applied to polymeric reaction product obtained as in 1(a) above. Heating is continued then for another hour at 90°–100° C. at 20 mm. to remove all water. The step of addition of acetic anhydride is omitted. The polymer is, however, treated with 10 parts of phosphorus pentoxide, five parts of 100% phosphoric acid, five parts of pyrogallol, and 150 parts of tricresyl phosphate. This mixture is heated as above and monomer taken off up to 240° C. (pot temperature). The distillate amounts to 870 parts (65% gross yield), but is definitely less stable than above products and is also somewhat impure. Large amounts of polymer form throughout the condenser and receiver. After redistillation of this product, the distillate is treated with benzoyl peroxide and heated. Polymer which has flaws and some color forms.

Example 4

There are mixed 312 (3.15 moles) of methyl cyanoacetate and 92 parts of paraformaldehyde. The mixture is stirred and heated to 95° C. for four hours. Addition is made of 110 parts of the dimethyl ether of triethylene glycol and heating is continued for an hour at 85°–95° C. The mixture is subjected to reduced pressure and water is distilled off with the pot temperature carried to 110° C./150 mm. The mixture is cooled to about 75° C. and is treated with 100 parts of acetic anhydride and two parts of acetyl chloride. The resulting mixture is stirred and heated at 90° C. for a half hour. Addition is made of five parts of pyrogallol and five parts of phosphorus pentoxide. The mixture is heated under reduced pressure with distillation of acetic acid, acetic anhydride, and finally the dimethyl ether of triethylene glycol. Heating of the mixture is continued with evolution of the desired product as the temperature of the mixture is raised to 170° C. to 230° C. while pressure is reduced from about 40 mm. to 2 mm. The amount of methyl α-cyanoacrylate collected in a cooled receiver is about 89% of the theory.

A hard, water-clear polymer is formed by this product when it is treated with dimethyl azodiisobutyrate and warmed.

Example 5

There are mixed 1446 parts by weight of ethyl cyanoacetate and 378 parts of paraformaldehyde. This mixture is heated to 79° C. and thereto is added slowly over an hour a solution of 1.8 parts of piperidine in 200 parts of the dimethyl ether of diethylene glycol. The temperature of the reaction mixture increases to 88° C. at which temperature level the reaction mixture is held for an hour and a half. At this time addition is made of 400 parts of the dimethyl ether of diethylene glycol. The pressure on the mixture is reduced while it is heated at 105° C. and 165 mm. with water being taken off. The mixture is cooled to 85° C. and there are added 350 parts of acetic anhydride together with 12 parts of acetyl chloride. This mixture is stirred for a half hour. At this point it is desirable to add more fluidizing agent, 50 parts of tricresyl phosphate being a suitable amount. There are also added as stabilizers and inhibitors 30 parts of phosphorus pentoxide, 10 parts of 100% phosphoric acid, and nine parts of pyrogallol. The mixture is then heated, the volatile products being taken off and condensed. After a forerun with pot temperatures of 82° to 170° C. in which acetic acid, acetic anhydride, and dimethyl ether of diethyleneglycol are taken off, ethyl α-cyanoacrylate distills. Between 170° and 240° C./5–20 mm. (pot temperatures), 1176 parts of this ester are collected. This product has a boiling point of 50°–54° C./1.8 mm. and may be redistilled to yield a pure, colorless product. The crude product and the redistilled product both yield solid hard polymers when treated with a polymerization initiator. The polymer has a heat distortion temperature of 105° C., a Vicat softening temperature of 128° C., and an impact strength of 5.3.

In place of the above ethyl cyanoacetate there may be used other lower alkyl cyanoacetates in which the alkyl group is primary or secondary.

*Example 6*

There are mixed 598 parts of butyl cyanoacetate and 126 parts of paraformaldehyde. This mixture is heated to 85° C. and treated with a solution of two parts of piperidine in 80 parts of the dimethyl ether of diethylene glycol. The resulting mixture is stirred and heated at 85°–90° C. for an hour. There is then added 160 parts of dimethyl ether of diethylene glycol and heating is continued at reduced pressure. Water is rapidly evolved and the pot temperature is carried to about 110° C. at 170–175 mm. pressure. About 70 parts of water are removed. To the mixture is added 150 parts of acetic anhydride and two parts of acetyl chloride and the mixture is held at 90–100° C. for one hour. The mixture is now cooled below 90° C. and treated with tricresyl phosphate (100 parts) to assist in fluidizing the mixture. There are also added five parts of pyrogallol, 10 parts of phosphorus pentoxide, and five parts of 100% phosphoric acid. This mixture is now heated. A forerun is taken off up to 180° C. and the desired product, butyl α-cyanoacrylate, taken off up to a pot temperature of 240° C./3 mm. The product is fractionally distilled and at 69°–72° C./1.6 mm. pure butyl α-cyanoacrylate in a 78% yield is collected. It has a refractive index, $n_D^{25}$, of 1.4410. A sample poured into methanol is converted to a white, powdered polymer. Another sample treated with 0.2% of azodiisobutyronitrile and warmed to 65° C. is converted to a solid polymer. It has a Vicat softening temperature of 109° C.

An equivalent of acetic anhydride is propionic anhydride. Also, the acid anhydride may be supplemented with an acyl halide, such as acetyl chloride.

The treatment of the reaction mixture, preferably after water has been separated therefrom, with acetic anhydride markedly improves the quality of the final alkyl α-cyanoacrylate and also increases the yield of pure alkyl α-cyanoacrylate. It has been observed that however carefully and thoroughly water is removed from the reaction mixture by the usual methods of mechanical separation, azeotropic distillation, or absorption on drying agents, there is always indication of water in later stages unless a step such as that of adding acetic anhydride or its evident equivalents is used. A possible explanation for this is the presence of terminal hydroxyl groups in the polymer which forms during the reaction of cyanoacetate and formaldehyde and which again provides water when the polymer is cracked to monomer. Furthermore, the nature of the polymer may be somewhat different when acetic anhydride is present. Any terminal hydroxyl groups would be acylated and when the acylated polymer is cracked to monomer, an acid is formed and this has the effect of stabilizing the final product.

I claim:

1. A process for preparing lower alkyl α-cyanoacrylate which comprises reacting about equimolar proportions of formaldehyde and a non-tertiary lower alkyl cyanoacetate between about 50° and about 110° C. in the presence of 0.01% to about 0.1% of an alkaline catalyst based on the weight of the said cyanoacetate, separating water from the reaction mixture, adding acetic anhydride in a proportion between about 0.1 and 1.5 moles of anhydride per mole of said cyanoacetate, heating the resulting mixture with distillation of acetic acid and acetic anhydride, then heating to a pot temperature between 160° and 240° C., and distilling off a non-tertiary lower alkyl α-cyanoacrylate, said alkyl group containing from 1 to 4 carbon atoms.

2. A process for preparing non-tertiary lower alkyl α-cyanoacrylate which comprises reacting together about equimolar proportions of formaldehyde and non-tertiary alkyl cyanoacetate between about 50° and 110° C., separating water from the reaction mixture, adding to the reaction mixture an anhydride from the class consisting of acetic and propionic anhydrides in a proportion between about 0.1 and 1.5 moles of said anhydride per mole of said cyanoacetate there being always present an amount of said anhydride in at least equimolecular amounts to the hydroxyl groups present in the reaction mixture, heating the resulting mixture with the distillation of the acid of said anhydride and any excess of said anhydride, then heating to a pot temperature between 160° to 240° C. and distilling off at reduced pressure non-tertiary lower alkyl α-cyanoacrylate, said alkyl group containing from 1 to 4 carbon atoms.

3. A process for preparing methyl α-cyanoacrylate which comprises mixing and reacting together about equimolar proportions of formaldehyde and methyl cyanoacetate between about 50° and about 110° C. in the presence of 0.01% to about 0.1% of an alkaline catalyst based on the weight of the methyl cyanoacetate, separating water from the reaction mixture, adding acetic anhydride in a proportion between about 0.1 and 1.5 moles of anhydride per mole of methyl cyanoacetate, heating the resulting mixture with distillation of acetic acid, then heating to a pot temperature between 160° and 240° C., and distilling off methyl α-cyanoacrylate at reduced pressure.

4. A process for preparing methyl α-cyanoacrylate which comprises mixing and reacting together about equimolar proportions of formaldehyde and methyl cyanoacetate between about 50° and about 110° C. in the presence of 0.01% to about 0.1% of an alkaline catalyst based on the weight of the methyl cyanoacetate, separating water from the reaction mixture, adding acetic anhydride in a proportion between about 0.1 and 1.5 moles of anhydride per mole of methyl cyanoacetate, heating the resulting mixture with distillation of acetic acid and acetic anhydride, then heating to a pot temperature between 160° and 240° C., and distilling off methyl α-cyanoacrylate at reduced pressure.

5. A process for preparing ethyl α-cyanoacrylate which comprises mixing and reacting together between about 50° and 110° C. about equimolecular proportions of formaldehyde and ethyl cyanoacetate in the presence of 0.01% to 0.1% of an alkaline catalyst based on the weight of the ethyl cyanoacetate separating water from the reaction mixture, adding acetic anhydride in a proportion between about 0.1 and 1.5 moles of anhydride per mole of ethyl cyanoacetate, heating the resulting mixture, distilling acetic acid and acetic anhydride therefrom, then heating the mixture to a pot temperature between 160° and 240° C. under reduced pressure, and distilling off ethyl α-cyanoacrylate.

6. A process for preparing butyl α-cyanoacrylate which comprises mixing and reacting together between about 50° and 110° C. about equimolecular proportions of formaldehyde and butyl cyanoacetate in the presence of 0.01% to 0.1% of an alkaline catalyst based on the weight of the butyl cyanoacetate separating water from the reaction mixture, adding acetic anhydride in a proportion between about 0.1 and 1.5 moles of anhydride per mole of butyl cyanoacetate, heating the resulting mixture, distilling acetic acid and acetic anhydride therefrom, then heating the mixture to a pot temperature between 160° and 240° C. under reduced pressure and distilling off butyl α-cyanoacrylate.

References Cited in the file of this patent

UNITED STATES PATENTS

| | | |
|---|---|---|
| 2,721,858 | Joyner et al. | Oct. 25, 1955 |
| 2,746,990 | Fortuin et al. | May 22, 1956 |